United States Patent [19]

Vives

[11] Patent Number: 4,997,887

[45] Date of Patent: Mar. 5, 1991

[54] POLY(ARYLENE SULFIDE) COMPOSITIONS CONTAINING POLY(STYRENE SULFONIC ACID SALTS)

[75] Inventor: Van C. Vives, Bartlesville, Okla.

[73] Assignee: Phillips Petroleum Company, Bartlesville, Okla.

[21] Appl. No.: 452,477

[22] Filed: Dec. 19, 1989

[51] Int. Cl.$^5$ .............................................. C08L 81/00
[52] U.S. Cl. ...................................... 525/189; 524/609
[58] Field of Search ......................................... 525/189

[56] References Cited

U.S. PATENT DOCUMENTS

| | | | |
|---|---|---|---|
| 3,839,301 | 10/1974 | Scoggins | 260/79 |
| 4,012,324 | 3/1977 | Gregor | 210/500.37 |
| 4,690,972 | 9/1987 | Johnson et al. | 524/609 |
| 4,735,977 | 4/1988 | Bier et al. | 524/158 |
| 4,743,638 | 5/1988 | Bier et al. | 524/141 |

*Primary Examiner*—John C. Bleutge
*Assistant Examiner*—David W. Woodward
*Attorney, Agent, or Firm*—Beverly M. Dollar

[57] ABSTRACT

A rapidly crystallizable composition is provided which comprises a poly(arylene sulfide) polymer and a sufficient amount of poly(styrene sulfonic acid salt) to improve the crystallizability of the poly(arylene sulfide) polymer.

16 Claims, No Drawings

POLY(ARYLENE SULFIDE) COMPOSITIONS CONTAINING POLY(STYRENE SULFONIC ACID SALTS)

FIELD OF THE INVENTION

This invention relates to poly(arylene sulfide) (PAS) compositions. In another aspect, this invention relates to PAS compositions which exhibit improved crystallinity properties. In yet another aspect, this invention also relates to methods of preparing said compositions.

BACKGROUND OF THE INVENTION

Poly(arylene sulfide) resins have become well known in the art for their thermal resistance, chemical resistance, good overall electrical insulative properties, unusual insolubility and inherent flame resistance. PAS resins can be compounded with fillers and reinforcing fibers to enhance certain of these properties and to provide compounds useful in more specific applications. For example, glass reinforcement of PAS resins produces injection and compression molding compounds which exhibit high tensile strength, high flexural modulus, good flexural strength, high heat deflection temperature, low elongation, and moderate impact strength.

The excellent physical properties of PAS resins make these compounds highly useful in manufacturing articles by injection molding techniques. However, the production of shaped articles from PAS compounds by injection molding can require high mold temperatures and relatively long molding cycle times which require expensive energy expenditures. It would, therefore, be desirable to have a rapidly crystallizable PAS resin so that shorter mold cycle times and/or lower mold temperatures could be utilized to increase profitability.

It is an object of this invention to provide a method of producing a more rapidly crystallizing PAS resin. A further object of this invention is to provide a thermoplastic composition comprising PAS and a poly(styrene sulfonic acid salt) which crystallizes more rapidly. Another object of this invention is to provide a method of increasing the melt crystallization temperature and decreasing the cold crystallization temperature of a PAS resin and therefore broaden the processing window of the PAS resin. By this method, PAS resins are provided which upon injection molding require less energy and time expenditure.

Other objects, aspects, and the several advantages of this invention will be apparent to those skilled in the art upon a study of the specification and the appended claims.

SUMMARY OF THE INVENTION

According to this invention, a rapidly crystallizing PAS resin composition is provided which comprises a PAS resin and about 0.05 to 10 weight percent of at least one poly(styrene sulfonic acid salt), wherein the weight percentage is based on the weight of the PAS excluding any fillers, stabilizers, etc. The addition of the poly(styrene sulfonic acid salt) according to this invention enables the degree of crystallinity required for the high stability of shape to be achieved more rapidly and therefore allows the PAS composition to be processed using shorter injection molding cycles, or lower molding temperatures.

DETAILED DESCRIPTION OF THE INVENTION

Any crystallizable PAS polymer can be employed in this invention, including copolymers, mixtures and blends. The PAS polymer can be prepared by any method known to those of ordinary skill in the art, such as that described in U.S. Pat. No. 3,354,129. Generally, the PAS polymer is prepared by reacting a polyhalo-substituted cyclic compound containing unsaturation between adjacent ring atoms and an alkali metal sulfide in the presence of a polar organic compound. The resulting polymer contains the cyclic structure of the polyhalo-substituted compound coupled in repeating units through sulfur atoms. The PAS polymer can be manufactured as described in U.S. Pat. No. 2,513,188 by reacting mixtures such as p-dichlorobenzene and 1,2,4-trichlorobenzene with sulfur and a metal halide at fusion temperatures. PAS polymers can also be manufactured by the method in British Pat. No. 962,941 wherein metal salts of halothiophenols are heated at a polymerizing temperature. The PAS polymer can also be an essentially linear, high molecular weight PAS, produced by reacting anhydrous sodium sulfide with polyhalo-substituted cyclic compounds in polar organic compounds and in the presence of alkali metal carboxylates as disclosed in U.S. Pat. No. 3,919,177. The PAS can be an uncured resin or the resin can be subjected to a curing procedure such as that described in U.S. Pat. No. 3,354,129 and U.S. Pat. No. 3,919,177.

The invention can also be employed using other types of PAS resins such as poly(arylene sulfide-ketone) resins (PASK) and poly(arylene sulfide-diketone) resins (PASDK). The PASK resins can be prepared as described in U.S. Pat. No. 4,716,212 by the reaction of an aromatic dihalo compound in which each halogen atom is activated by a ketone group present in the para position, with an amount of an alkali metal sulfide in the presence of a polar compound.

The PASDK resins which can be used generally contain the repeating unit

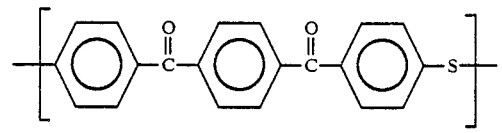

The preferred PAS polymer for use in the invention is poly(phenylene sulfide) (PPS).

The poly(styrene sulfonic acid salts) useful in this invention as crystallizing or nucleating agents can be characterized as having molecular weights of approximately 1,000 to 10,000,000 and whose cation is independently selected from the group consisting of sodium, potassium, calcium or barium.

Generally, any amount of the nucleating agent can be employed which is effective to impart an increased crystalizing rate to PAS resins. The amount employed will generally be in the range of about 0.05 to about 10 weight percent, preferably about 0.1 to 8 weight percent, based on the combined weights of the additive and the PAS resin exclusive of fillers, reinforcing agents, plasticizers, etc.

The compositions of this invention comprising PAS resins and poly(styrene sulfonic acid salts) as described above can also contain fillers, processing aids, pigments, stabilizers and the like which are typically employed in PAS compositions. For example, fillers such as clay, talc, silica, alumina, titanium dioxide, chopped glass fibers and the like can be employed. Other materials useful in the PAS compositions as processing aids or corrosion inhibitors include lithium carbonate, sodium carbonate, calcium carbonate, zinc stearate and polyethylenes.

The PAS resin and poly(styrene sulfonic acid salt) plus any fillers, processing aids, pigments and the like, if added, can be mixed together by any conventional means known to those of ordinary skill in the art. For example, particles or pellets of the PAS resin and the nucleating agent can be simply physically mixed together at ambient conditions in appropriate equipment. The poly(styrene sulfonic acid salt) can alternatively be added subsequent to the preparation of the PAS polymer in the polymerization reactor. It is also possible to add the poly(styrene sulfonic acid salt) to a solution or slurry of the PAS polymer and then recover the PAS polymer containing the nucleating agent by conventional methods, such as flash recovery, filtration or the like.

Addition of the nucleating agent to the PAS resin according to this invention increases the processing window of the compound by increasing the melt crystallization temperature ($T_{mc}$) and decreasing the cold crystallization temperature ($T_{cc}$) of the polymer. One index of the crystallizability of a resin is given by the crystallization window ($C_w$), which can be calculated as follows:

$$\text{Crystallization Window } C_w = \frac{T_{mc} - T_{cc}}{T_m - T_g} \times 100$$

where Tmc is the melt crystallization temperature, Tcc is the cold crystallization temperature, Tm is the crystalline melting point, and Tg is the glass transition temperature. An increase in the crystallization window indicates increased crystallizability of the resin which in turn will aid its processing by reducing mold cycle times.

The following examples serve to illustrate the invention, and are not meant to limit the scope of the invention.

EXAMPLES

This example describes an invention composition comprising a poly(arylene sulfide) resin and a poly(styrene sulfonic acid salt). A 5.77 gram sample of an uncured PAS resin, Resin 1, poly(phenylene sulfide) (PPS) which was prepared according to the method described in U.S. Pat. No. 3,919,177, having a melt flow of 68 g/10 min. when measured in accordance with ASTM D 1238, Condition 315/5.0 (modified to use only a 5 minute preheat time) was physically mixed with a 0.302 gram sample of poly(styrene sulfonic acid sodium salt) obtained from Polyscience Incorporated. The two samples were physically mixed by placing in a closed container and agitating the container for approximately 3 minutes. The resulting physical mixture was then melt blended by passing through a melt flow instrument at 600° F. The $T_{mc}$, $T_{cc}$, $T_g$ and $T_m$ for this blended material was then measured using differential scanning calorimetry (DSC). The results are listed below in Table I.

Two other PAS resin samples were prepared. Both of these resins were also PPS. However the second resin (Resin 2) was an air-cured PPS prepared according to the method disclosed in U.S. Pat. No. 3,354,129 and the third resin (Resin 3) was a trichlorobenzene-modified PPS of the general type disclosed in such patents as 4,116,947; 4,282,347; 4,350,810; 4,038,261 and 4,038,262. As for Resin 1, 5 wt.% of the poly(systrene sulfonic acid sodium salt) was incorporated in Resins 2 and 3. The $T_{mc}$, $T_{cc}$, $T_g$ and $T_m$ of Resins 2 and 3 with additive were measured by DSC. The results are listed below in Table I.

TABLE I

Effect of Nucleating Agent on the $T_{mc}$, $T_{cc}$, and $C_w$ of PAS Resins

| | $T_g$ | $T_m$ | $T_{mc}$ | $T_{cc}$ | $C_w$ |
|---|---|---|---|---|---|
| Resin 1[a] | 90 | 278 | 195 | 143 | 27.6 |
| Resin 1 + 5% Additive | 91 | 279 | 206 | 139 | 35.6 |
| Resin 2[b] | 91 | 277 | 226 | 132 | 50.5 |
| Resin 2 + 5% Additive | 91 | 276 | 237 | 128 | 58.9 |
| Resin 3[c] | 92 | 278 | 191 | 155 | 19.4 |
| Resin 3 + 5% Additive | 91 | 279 | 201 | 148 | 28.2 |

[a] Melt Flow = 187 g/10 mins.
[b] Melt Flow = 121 g/10 mins.
[c] Melt Flow = 68 g/10 mins.

Table I demonstrates that the addition of the poly(styrene sulfonic acid salt) to the PAS resin has a significant effect on the crystallization window and thus on the crystallizability of the PAS resins. The data show that generally the $T_{mc}$ increased, $T_{cc}$ was lowered, and thus the crystallization window was broadened. Resin 1 achieved a 29 percent increase in the crystallization window through the addition of 5 percent of the nucleating agent, Resin 2 demonstrated a 17 percent increase in the crystallization window, and Resin 3 demonstrated a 45 percent increase in the crystallization window by addition of a nucleating agent.

In addition to the measurements set out above, measurements were made in order to determine the total amount of time required for the poly(arylene sulfide) resins to obtain maximum crystallization and the amount of time needed for the poly(arylene sulfide) resin to reach its maximum crystallization rate. The results are listed below in Table II.

TABLE II

Effect of Nucleating Agent on the Crystallization Time and Rate of PAS Resins

| | Total Time, min. | Time to Maximum Rate, min. |
|---|---|---|
| Resin 1 | 11.0 | 3.0 |
| Resin 1 + 5% Additive | 6.6 | 2.2 |
| Resin 2 | 12.4 | 2.4 |
| Resin 2 + 5% Additive | 9.8 | 2.2 |
| Resin 3 | 8.4 | 3.6 |
| Resin 3 + 5% Additive | 6.5 | 2.9 |

The data set out in Table II show that the addition of 5 wt.% of the poly(styrene sulfonic acid sodium salt) as the nucleating agent decreased the total time necessary to reach maximum crystallization as well as the time necessary to reach the maximum crystallization rate.

While this invention has been described in detail for the purpose of illustration, it is not to be construed as limited thereby, but is intended to cover all reasonable changes and modifications within the spirit and scope thereof.

That which is claimed is:

1. A composition consisting essentially of a poly(arylene sulfide) polymer and a sufficient amount of at least one poly(styrene sulfonic acid salt) to broaden the crystallization window of said poly(arylene sulfide) polymer.

2. A composition according to claim 1 wherein the amount of said poly(styrene sulfonic acid salt) in said composition ranges from 0.05 to 10 weight percent of said base poly(arylene sulfide) polymer.

3. A composition according to claim 1 wherein the poly(styrene sulfonic acid salt) is selected from the group consisting of:
   poly(styrene sulfonic acid sodium salt);
   poly(styrene sulfonic acid potassium salt);
   poly(styrene sulfonic acid calcium salt); and
   poly(styrene sulfonic acid barium salt).

4. A composition according to claim 1 wherein said poly(arylene sulfide) polymer is poly(phenylene sulfide).

5. A composition according to claim 1 wherein the poly(arylene sulfide) polymer is an essentially linear poly(phenylene sulfide) which has not been subjected to a curing procedure.

6. A composition according to claim 1 wherein said composition consists essentially of poly(phenylene sulfide) and about 0.05 to 10 weight percent poly(styrene sulfonic acid sodium salt) based on said base poly(phenylene sulfide) polymer.

7. A composition according to claim 1 wherein said composition further contains at least one component selected from the group consisting of fillers, reinforcing agents, processing aids, stabilizers, corrosion inhibitors and coloring agents.

8. A method for broadening the crystallization window of a poly(arylene sulfide) polymer which consists essentially of incorporating an effective amount of at least one poly(styrene sulfonic acid salt) in said poly(arylene sulfide) polymer.

9. A method according to claim 8 wherein the amount of said poly(styrene sulfonic acid salt) ranges from 0.05 to 10 weight percent of said base poly(arylene sulfide) polymer.

10. A method according to claim 8 wherein the poly(styrene sulfonic acid salt) is selected from the group consisting of:
    poly(styrene sulfonic acid sodium salt);
    poly(styrene sulfonic acid potassium salt);
    poly(styrene sulfonic acid calcium salt); and
    poly(styrene sulfonic acid barium salt).

11. A method according to claim 8 wherein the poly(styrene sulfonic acid salt) is incorporated in said poly(arylene sulfide) polymer by physically mixing said salt and said polymer together under ambient conditions.

12. A method according to claim 8 wherein said poly(arylene sulfide) polymer is an essentially linear poly(phenylene sulfide) which has not been subjected to a curing procedure.

13. A method according to claim 12 wherein about 0.1 to about 8 weight percent poly(styrene sulfonic acid sodium salt) is incorporated based on the weight of said base poly(phenylene sulfide) polymer.

14. A method according to claim 8 wherein additives selected from fillers, reinforcing agents, processing aids, stabilizers corrosion inhibitors, and coloring agents are present in said polymer.

15. An injection molded object prepared from the composition of claim 1.

16. An injection molded object prepared from the composition of claim 6.

* * * * *